(12) United States Patent
Bureacov et al.

(10) Patent No.: US 10,444,461 B1
(45) Date of Patent: Oct. 15, 2019

(54) METHODS, SYSTEMS AND APPARATUS FOR MANUFACTURING A CABLE ASSEMBLY WITH BREAKOUT AND MOLDED CABLE ASSEMBLY

(71) Applicant: AFL IG LLC, Kent, WA (US)

(72) Inventors: Artur Bureacov, Tacoma, WA (US); Terry M. Kleeberger, Tacoma, WA (US)

(73) Assignee: AFL IG LLC, Kent, WA (US)

( * ) Notice: Subject to any disclaimer, the term of this patent is extended or adjusted under 35 U.S.C. 154(b) by 160 days.

(21) Appl. No.: 15/253,852

(22) Filed: Aug. 31, 2016

Related U.S. Application Data

(60) Provisional application No. 62/341,504, filed on May 25, 2016, provisional application No. 62/212,585, filed on Aug. 31, 2015.

(51) Int. Cl.
| | | |
|---|---|---|
| *B29C 33/02* | (2006.01) | |
| *G02B 6/44* | (2006.01) | |
| *B29C 35/02* | (2006.01) | |
| *B29C 33/38* | (2006.01) | |
| *B29L 11/00* | (2006.01) | |

(52) U.S. Cl.
CPC ........ *G02B 6/4479* (2013.01); *B29C 33/3842* (2013.01); *B29C 35/02* (2013.01); *G02B 6/4471* (2013.01); *B29L 2011/0075* (2013.01)

(58) Field of Classification Search
CPC .................................................. G02B 6/4471
See application file for complete search history.

(56) References Cited

U.S. PATENT DOCUMENTS

| | | | |
|---|---|---|---|
| 6,857,900 B2 | 2/2005 | Kleeberger et al. | |
| 6,953,896 B2 | 10/2005 | Kleeberger et al. | |
| 7,166,805 B2 | 1/2007 | Robinson et al. | |
| 7,188,415 B2 | 3/2007 | Robinson et al. | |
| 7,270,485 B1 | 9/2007 | Robinson et al. | |
| 7,494,284 B2 | 2/2009 | Robinson et al. | |
| 8,172,465 B2 | 5/2012 | Kleeberger | |
| 2008/0138020 A1* | 6/2008 | Robinson ............. | G02B 6/4471 385/106 |
| 2008/0138026 A1* | 6/2008 | Yow ..................... | G02B 6/4471 385/137 |
| 2016/0041357 A1* | 2/2016 | White ................... | G02B 6/406 385/78 |

(Continued)

FOREIGN PATENT DOCUMENTS

| | | |
|---|---|---|
| WO | WO 2015/134683 | 9/2015 |
| WO | WO 2016/069514 | 5/2016 |

*Primary Examiner* — Ryan M Ochylski
(74) *Attorney, Agent, or Firm* — DWC Law Firm, P.S.; David Chen

(57) ABSTRACT

Methods, systems and apparatus for manufacturing a fiber optic cable breakout assembly comprising a molded array of furcation tubes are provided. In some embodiments, a pin retainer is connected to a plurality of pins for use in facilitating heat transfer to furcation tubes and influencing a structural arrangement of a molded array of the furcation tubes. The pin retainer can be removably connected to a pull arm on a heating system for heating molding the furcation tubes, and the pull arm can be automatically retracted after a molding process is complete, to withdraw the pins from the molded array.

4 Claims, 9 Drawing Sheets

(56) References Cited

U.S. PATENT DOCUMENTS

2016/0124174 A1* 5/2016 Courchaine .......... G02B 6/4471
                                                    385/137
2016/0209615 A1* 7/2016 Bakatsias ............. G02B 6/4471
2017/0336568 A1* 11/2017 Kleeberger .......... G02B 6/4471

* cited by examiner

METHODS, SYSTEMS AND APPARATUS FOR MANUFACTURING A CABLE ASSEMBLY WITH BREAKOUT AND MOLDED CABLE ASSEMBLY

CROSS REFERENCE TO RELATED APPLICATION(S)

This application claims the benefit of U.S. Provisional Patent Application Nos. 62/341,504, filed May 25, 2016, and 62/212,585, filed Aug. 31, 2015, both of which are incorporated herein by reference in their entireties.

BACKGROUND

1. Technical Field

The present disclosure relates to optic fibers, and in particular, methods, systems and apparatus for manufacturing a cable assembly with breakout and a molded cable assembly.

2. Description of Related Art

Fiber optic cables are frequently used for interconnecting computer systems (e.g., servers) because these cables can simultaneously carry a large amount of data without excessive transmission loss. A trunkline is a type of fiber optic cable that typically includes multiple optic fibers and strength filaments (e.g., Kevlar yarns) arranged lengthwise and encased in a protective jacket (e.g., plastic or metal tubing). At each end of the trunkline, the optic fibers are furcated into individual cables that terminate at individual connectors.

One conventional technique for furcating the trunkline uses heat-shrink tubing and epoxy. FIG. 1, for example, illustrates a prior art furcated cable 100 having a furcation unit 101 with a heat-shrink tube 102 encasing an epoxy 104, a trunkline 106 connected to one end of the furcation unit 101, and furcation tubes 112 projecting from the other end of the furcation unit 101. The trunkline 106 includes a cable jacket 113 encasing portions of optic fibers 108 and cable filaments 110. Each furcation tube 112 includes a tube jacket 116 encasing tube filaments 114 and one of the optic fibers 108. The heat-shrink tube 102 overlaps both the trunkline 106 and the furcation tubes 112 to enclose a portion of the optic fibers 108 and filaments 110, 114. The epoxy 104 rigidly binds the enclosed optic fibers 108 and filaments 110, 114 inside the heat-shrink tube 102. Each optic fiber 108 extends from the trunkline 106, through the epoxy 104, and out from the furcation tubes 112. The optic fibers 108 can easily be damaged during installation, manufacturing, and other handling processes. For example, installing the furcated cable 100 during the connection of servers typically includes pulling on the cable jacket 113 to draw the trunkline 106 through cable trays, conduits, and other channelways. The furcation unit 101 transmits the pulling force directly to the optic fibers 108 because the epoxy 104 rigidly binds the optic fibers 108 to the cable jacket 113. The transmitted force can damage the fragile optic fibers 108.

U.S. Pat. Nos. 7,494,284, 7,270,485, and 8,172,465, disclose methods and devices for furcating fiber optic cables in a manner that reduces risk of damage to the optic fibers. For example, in one aspect of these disclosures, a furcated cable can include a bundled cable (e.g., a trunkline), furcation tubes, and a furcation unit positioned between the bundled cable and the furcation tubes. A plurality of optic fibers are slidably disposed in the bundled cable, furcation unit, and the furcation tubes, such that the optic fibers can move, or "piston," in a longitudinal direction. Although various designs disclosed in these patents are effective for reducing tensile forces applied to the optic fibers to reduce risk of damaging the fragile optic fibers, they can be bulky and labor intensive to employ.

DETAILED DESCRIPTION

In the present disclosure, certain specific details are set forth in order to provide a thorough understanding of various embodiments of the disclosure. However, upon reviewing this disclosure one skilled in the art will understand that the various embodiments disclosed herein may be practiced without many of these details. In other instances, some well-known structures, techniques, methods and materials of construction have not been described in detail to avoid unnecessarily obscuring the descriptions of the embodiments of the disclosure.

In the present disclosure, to the extent the terms "about" and "approximately" are used, they mean±20% of the indicated range, value, or structure, unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, and these terms, and variants thereof, are intended to be construed as non-limiting. The definitions in this paragraph are intended to apply throughout this disclosure unless otherwise expressly stated.

Various embodiments in this disclosure are described in the context of use with optic fibers and particular cable configurations, for purposes of illustration. However, as will be appreciated by those skilled in the art after reviewing this disclosure, various other structures/configurations for cables may be suitable for use with the apparatus, systems and methods disclosed herein, which may be modified in the spirit of this disclosure to fit such various structures/configurations.

Figure 1:
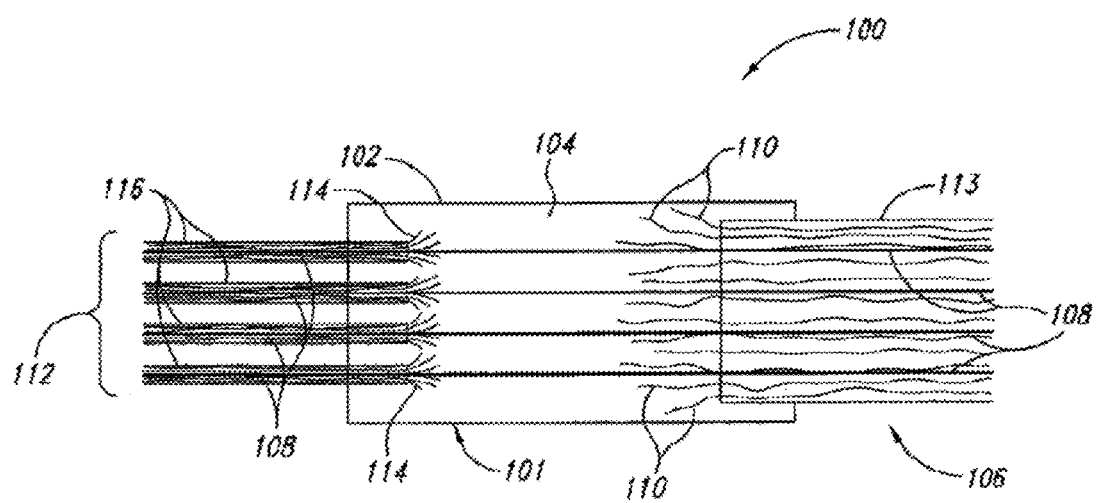
FIG. 1 is a simplified cross-sectional view of a furcated cable in accordance with the prior art.
Figure 2:
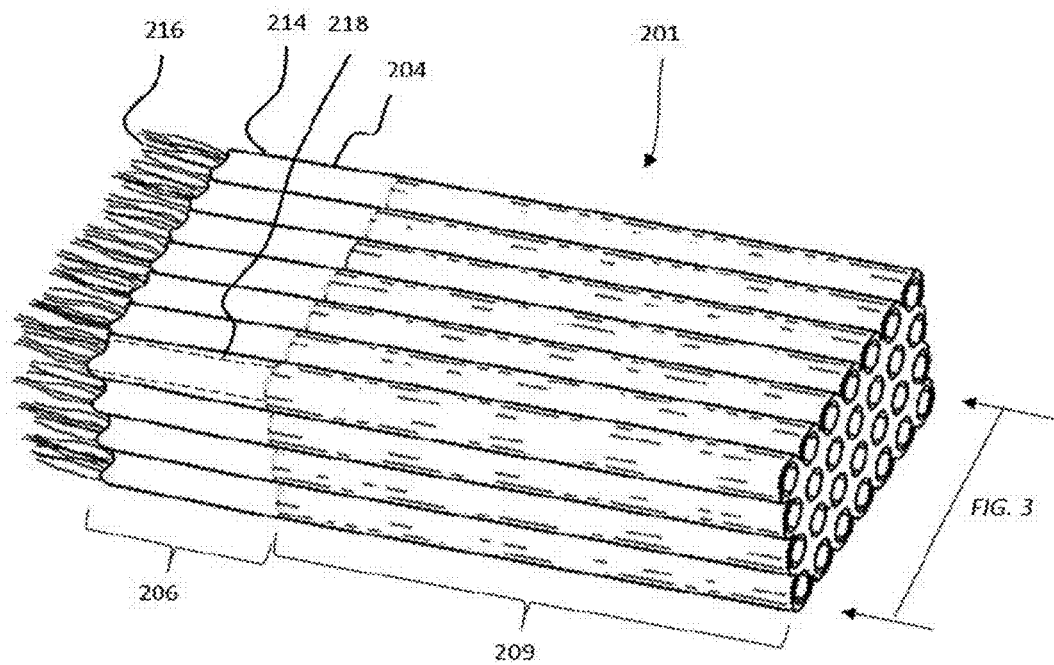
FIG. 2 is a partial perspective view of a molded array of furcation tubes, having a molded and unmolded portion, in accordance with some embodiments of the present disclosure.

Referring to FIG. 2, in some embodiments, a molded array 201 of furcation tubes is provided and can comprise a plurality of furcation tubes 204, molded together at a molded portion 209 of the molded array 201. The molded portion 209 can be a rearward portion (relative to FIG. 2) of the molded array 201. Each furcation tube 204 can include a tube jacket 214 (e.g., outer tube) and reinforcing filaments 216 (e.g., Kevlar threads) extending longitudinally therethrough. In some embodiments, longitudinally extending inner tubes 218 can also be provided within each tube jacket 214 in concentric fashion. In the molded portion 209, the reinforcing filaments 216 can be bonded into deformed material of the tube jacket 214 and inner tubes 218, which have been deformed through heat, as described further below. In the unmolded portion 206, the tube filaments 216 can extend longitudinally between the tube jacket 214 and the inner tubes 218, with the tube filaments 216 at least partially surrounding the inner tube 218 within each tube jacket 214.

The relative lengths of the unmolded portion 206 and molded portion 209 of the array 201, depend on the application; however, in most cases, the unmolded portion 206 will be longer (not fully illustrated) to allow slack/flexibility for manipulating the furcation tubes 204, to connect terminating ends of optic fibers to appropriate connections.

The tube jackets 214 and/or inner tubes 218 comprising the furcation tubes 204 can be constructed from plastic, or other suitable materials, such as, for example, Hytrel®. The tube filaments, or reinforcing filaments 216, can include, or consist of, strength fibers constructed from Kevlar, nylon, polyester, or other suitable materials.

Figure 3:
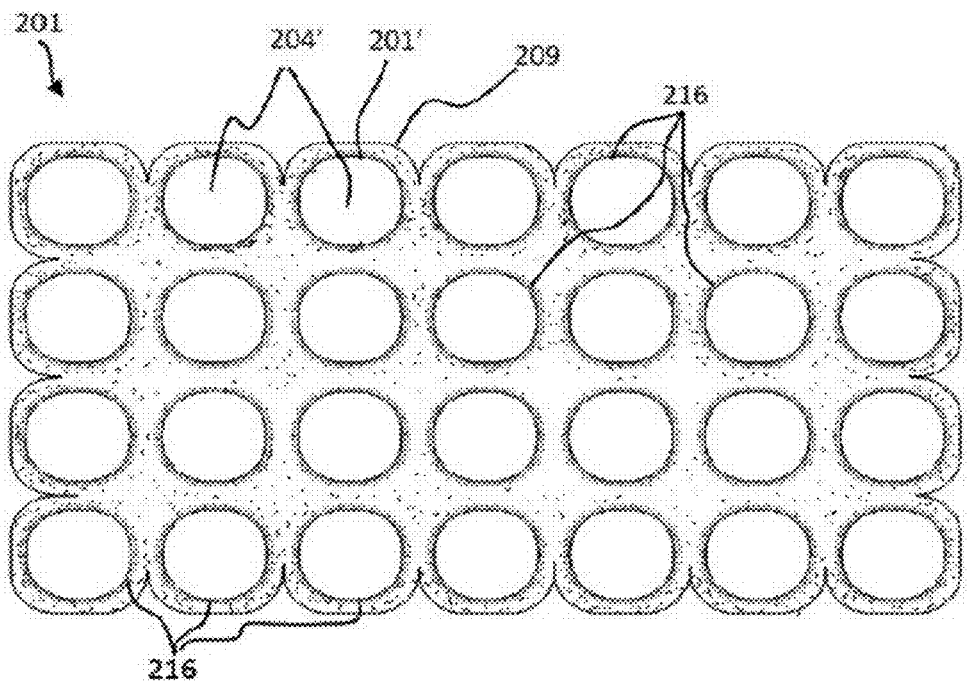
FIG. 3 is a rear elevation view from line FIG. 3 in FIG. 2.
Figure 4:
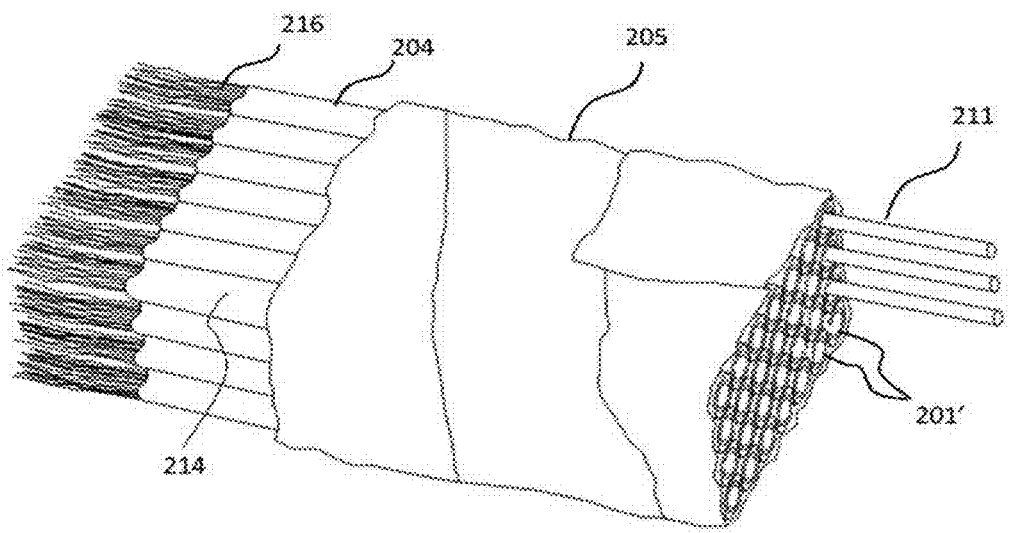
FIG. 4 is a partial perspective view of an array of furcation tubes with rearward portions thereof being prepared for heating to generate the molded array in FIG. 2, in accordance with some embodiments of the present disclosure.

In some embodiments, the molded portion 209 of the molded array 201, is formed by first arranging and compressing rearward portions of a plurality of furcation tubes 204 together, in side-by-side, or parallel, fashion, as shown in FIG. 4. Rearward end openings 201' of the furcation tubes 204 can be approximately aligned. In some embodiments, an adhesive material, such as a tape 205, can be used to retain the rearward portions together in this compressed configuration, under inward pressure applied from the tape 205 (the tape 205 is covering the rearward portions in FIG. 4). The taped portion can then be heated in this compressed configuration to cause the tube jackets 214 of the furcation tubes 204 to mold together into a molded portion 209, such as that shown in FIGS. 2 & 3. In some embodiments, the heat treatment combined with the compression deforms the tube jackets 214 and causes the reinforcing filaments 216 to be molded into, or otherwise firmly bonded into the material of construction of the tube jacket 214 and/or inner tubes 218 (if provided), in each of the furcation tubes 204 of the molded section 209. Moreover, in some embodiments, wherein inner tubes 218 are concentrically disposed within each tube jacket 214, the inner tubes 218 can also be molded into, or otherwise bonded to, the corresponding tube jackets 214, by the heat treatment. For example, as shown in FIG. 3, the tube filaments 216 have been bonded into the material that formed the separate tube jackets 214, and the material that formed the separate tube jackets 214 has also been fully or partially bonded together in the molded portion 209. In other embodiments, the heat or molding process can be imparted by various different methods, such as, for example, ultrasonic welding.

Referring to FIG. 4, in some embodiments, pins 211 made of metal, or other material that will not deform during the heat treatment, are longitudinally inserted into rearward portions of each of the furcation tubes 204 through rearward openings 201' thereof, prior to heat treating, to prevent the interior chambers of the furcation tubes 204 from collapsing during heating. The pins 211 can each have an outer diameter less than a resting internal diameter of the furcation tubes 204 prior to heating, but can be selected to be large enough to retain a sufficient internal diameter of internal chambers 204' of the molded portion 209 through which to accommodate optic fibers. Heating temperature and time for heating the rearward portions compressed by tape 5 in the array to form the molded portion 209 can be selected based on the materials of construction of the furcation tubes 204; however, in some embodiments, the rearward portions are heated up to 200-250 degrees F., for 5-8 minutes. In other embodiments, the temperature goals can be higher or lower, and the heating time can be longer or shorter. In some embodiments, the tape 5, which can be silicone tape, is selected so as not to mold into the furcation tubes 204 during heating, and thus, after heating to form the molded portion 209 of the molded array 201, the tape 205 can be easily removed, as will be appreciated by those skilled in the art after reviewing this disclosure.

Figure 5:
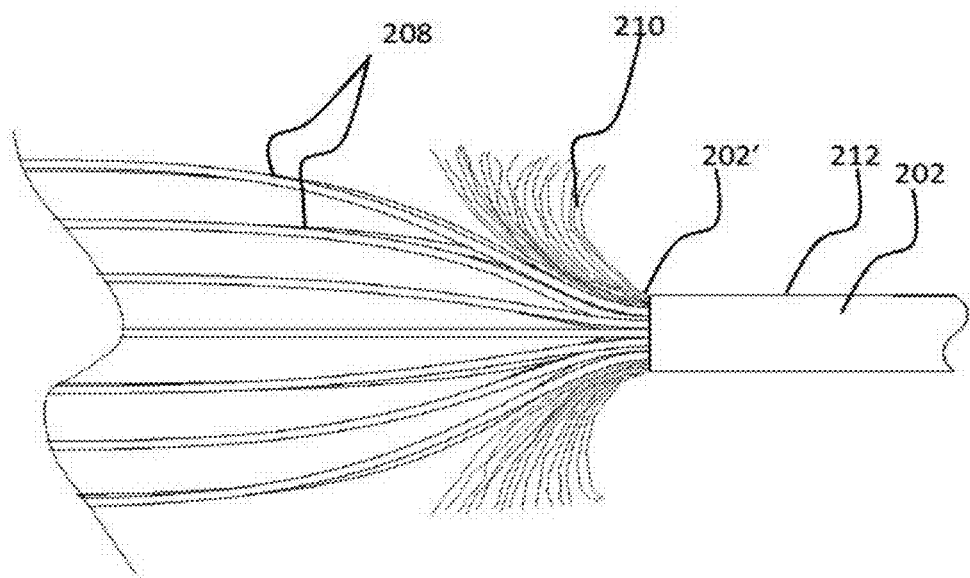
FIG. 5 is an overhead plan view of a prior art trunkline with optic fibers extending therefrom in preparation for assembling a cable assembly in some embodiments of the present disclosure.

Referring now to FIG. 5, a jacket 212 of a trunkline 202, or bundled cable 202, can be cut at a terminating end portion 202' thereof, in order to fanout the optic fibers 208 contained therein in preparation for assembling a furcation assembly 220 (See, e.g., FIG. 8) that utilizes the molded array 201 of furcation tubes.

Figure 6:
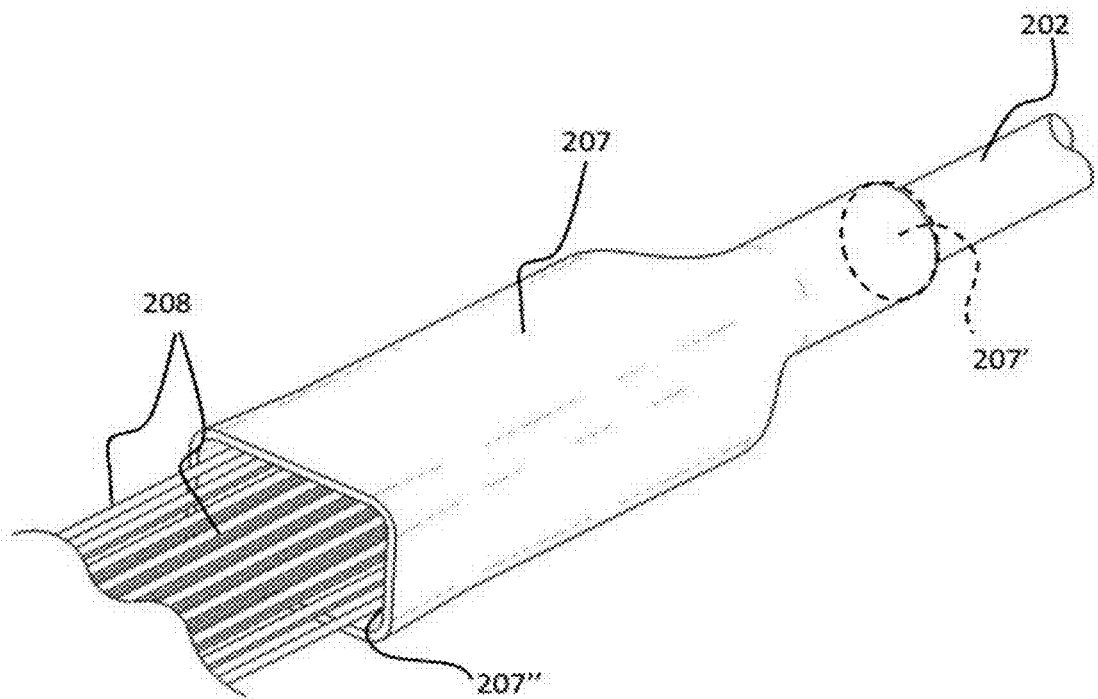
FIG. 6 is a perspective view of a housing having received the optic fibers from FIG. 5, during assembly of a cable assembly for some embodiments of the present disclosure.

Referring to FIG. 6, in some embodiments, all of the optic fibers 208 of the trunkline 202 can be passed through a housing 207, having an internal chamber, through an rearward or entrance opening 207' of the housing 207, and out through a forward or exit opening 207".

Figure 7:
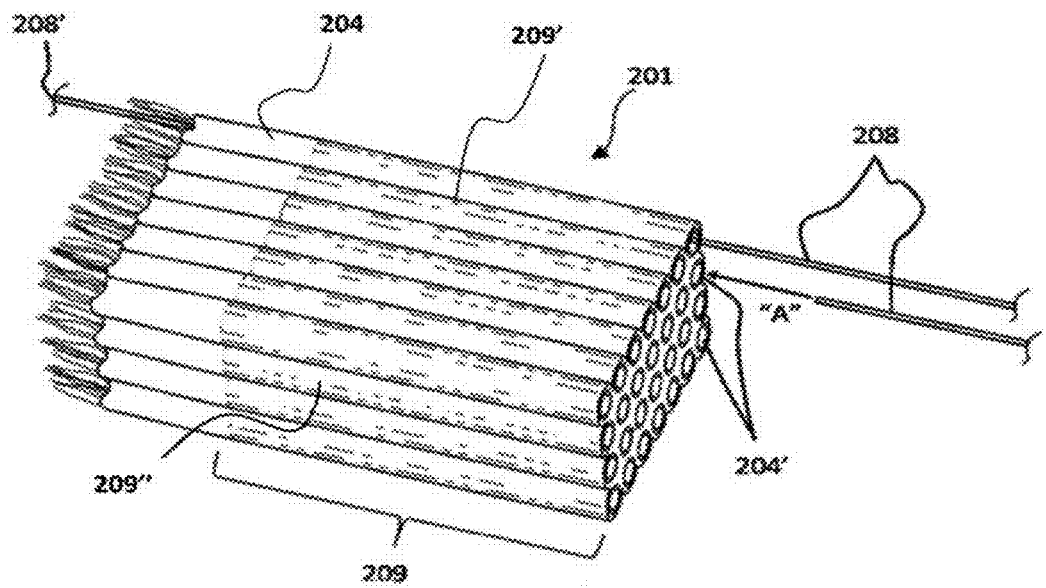
FIG. 7 is a partial perspective view of the molded array of furcation tubes (shown in FIG. 2) receiving optic fibers from the housing (shown in FIG. 6) during assembly of the fiber optic furcation assembly of FIG. 8, in accordance with some embodiments of the present disclosure.

Referring to FIGS. 7 & 3, each of the optic fibers 208 extending from the forward or exit opening 207" of the housing 207, can then be individually (e.g. manually) threaded through a corresponding internal chamber 204' on the molded portion 209 of the molded array 201, in the direction of arrow "A," to be passed through the internal chambers 204' of the molded portion 209, leading to separate furcation tubes 204 in the unmolded portion, to extend out from forward ends of the separate furcation tubes 204, in preparation for being selectively connected at opposite terminal ends 208'.

Figure 8:
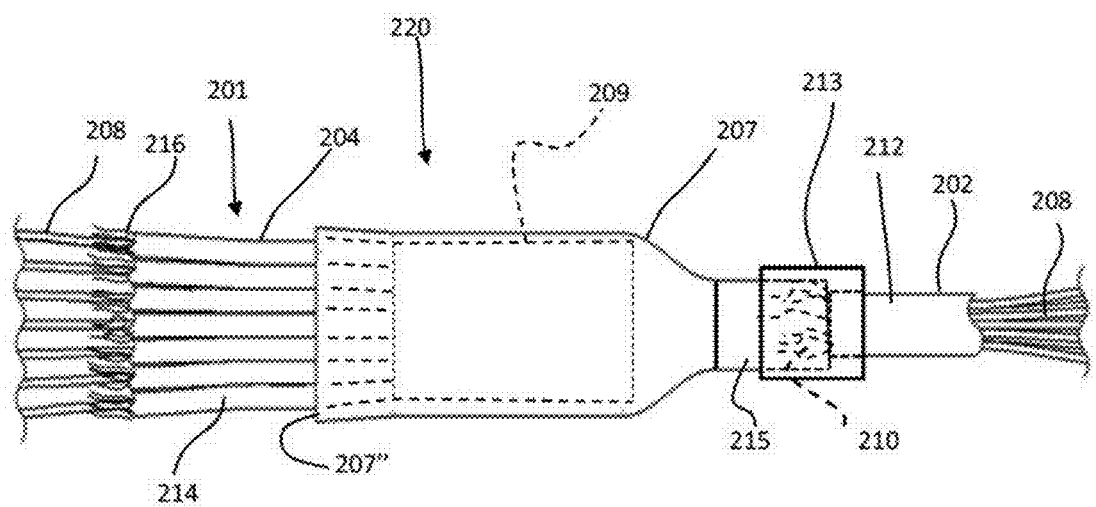
FIG. 8 is an overhead plan view of a fiber optic cable furcation assembly for some embodiments of the present disclosure, in which the molded array of FIG. 7 and the trunkline of FIG. 5, have each been fixedly coupled to the housing, without fixedly binding the optic fibers to the housing, or any of the tubes.

Referring now to FIG. 8, in some embodiments, after all of the optic fibers 208 of the trunkline 202 have been selectively threaded through corresponding internal chambers 204' of the molded array 201, a user can use epoxy or other glue to attach the molded portion 209 to an inside of the housing 207. For example, a user can spread a glue on an external surface of the molded portion 209, such as, for example, on the side 209" and top 209' (See, e.g., FIG. 7) of the molded portion 209, then insert the molded portion 209 through the forward or exit opening 207" of the housing 207, to be snuggly fit inside the housing 207 and to be bonded by the glue to an interior sidewall of the internal chamber of the housing 207, such as shown in FIG. 8. That is, for example, the top 209' and/or side 209" of the molded portion 209 may be pressed snuggly against inside sidewalls of the housing 207. The user can selectively apply the glue in an amount and location on the molded portion 209 that will avoid any contact of the glue with the optic fibers 208 inside the housing 207 when the molded portion 209 is pressed into the housing, as will be appreciated by those skilled in the art after reviewing this disclosure. This will allow the optic fibers 208 to be slidably movable through the furcation tubes 204.

Moreover, as shown in FIG. 8, in some embodiments, the trunkline 202 can be attached to the rearward or entrance end portion of the housing 207, by applying a crimp ring 213 to crimp the cable filaments 210 against an outer sidewall of a neck 215 portion of the entrance end of the housing 207, as will be appreciated by those skilled in the art after reviewing this disclosure.

In this manner as described above, the optic fibers 208 are longitudinally slidable/movable within the trunkline 202, housing 207, molded portion 209, and furcation tubes 204, while the trunkline jacket 212 and filaments 210, and the furcation tube jackets 214 (which can include inner tubes) and reinforcing filaments 216, are substantially fixedly retained to the housing 207. This helps ensure that the optic fibers 208 do not bear substantial tensile forces applied to the cable by users during cable installation, adjustment or otherwise, and this reduces risk of damaging the fragile optic fibers. In addition, the methods and apparatus disclosed herein are substantially more compact and less labor intensive than the prior art previously mentioned.

The molded portion 209 has been depicted herein as having a generally rectangular cross section and comprised of four (4) rows of seven (7) tubes per row. However, the depicted example molded portion 209 is not limiting, and as will be appreciated by those skilled in art after reviewing this disclosure, the number of rows of tubes and number of tubes per row can be selectively varied, and/or the cross sectional shape of the molded portion 209 can be selectively varied without deviating from the spirit of this disclosure.

Figure 9A:
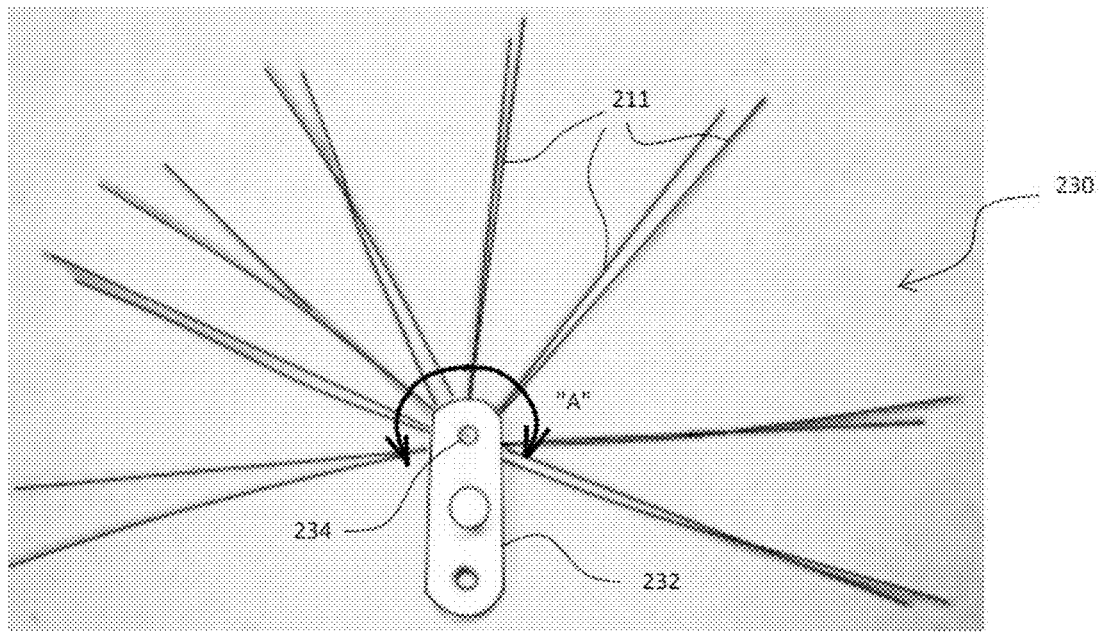
FIG. 9a is an overhead plan view of a pin assembly for some embodiments of the present disclosure.
Figure 9B:
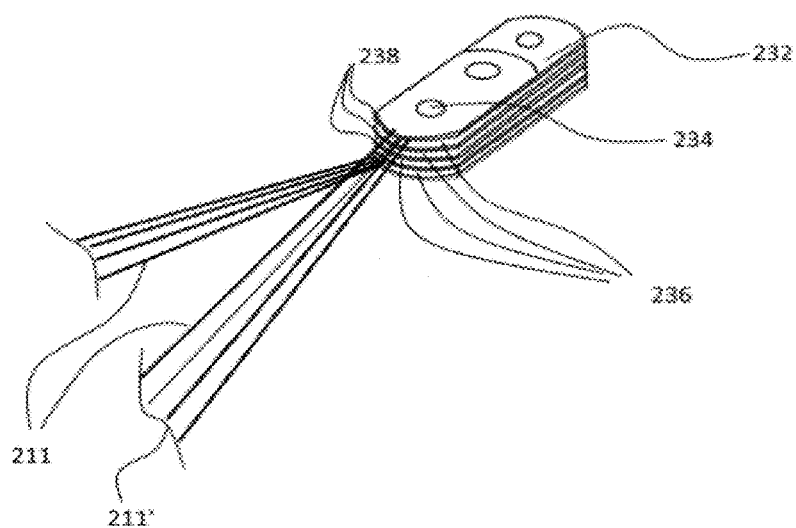
FIG. 9b is a perspective view of a pin retainer of the pin assembly of FIG. 9a for some embodiments of the present disclosure.

Referring to FIGS. 9a and 9b, in some embodiments, a pin assembly 230 is provided, having a plurality of pins 211, pivotably connected to a pin retainer 232, such that the pins can pivot generally in the direction arrows "A" about a vertical axis 234 of a pivot connection on the pin retainer 232, which can be defined by a retaining pin or other member. In some embodiments, the pin retainer 232 is comprised of a plurality of connected, horizontally disposed, layered separating strips 238 (e.g., walls), defining horizontally oriented slots 236 between each separating strip 238. The separating strips 238 can be connected together through a vertical pin(s), screw, etc., or other connection member. In some embodiments, a set 211' comprised of a plurality of pins 211 can be pivotably connected to the pin retainer 232 through each of the slots. FIG. 9b shows two sets 211' of pins 211 connected each through a separate slot 236; however, the remainder of slots 236 can also each be occupied by a set 211' of pins (not all pins are illustrated in FIG. 9b, for purposes of facilitating clarity). As will be appreciated by those skilled in the art after reviewing this disclosure, each set of pins 211' can be comprised of a number of pins, which can be, for example, without limitation, 4 pins, 6 pins, 7 pins, or more or less, etc., and although the pin retaining member 232 is illustrated as having four slots, the numbers of slots can be selectively provided, without limitation, based on the needs for a particular application.

Figure 10:
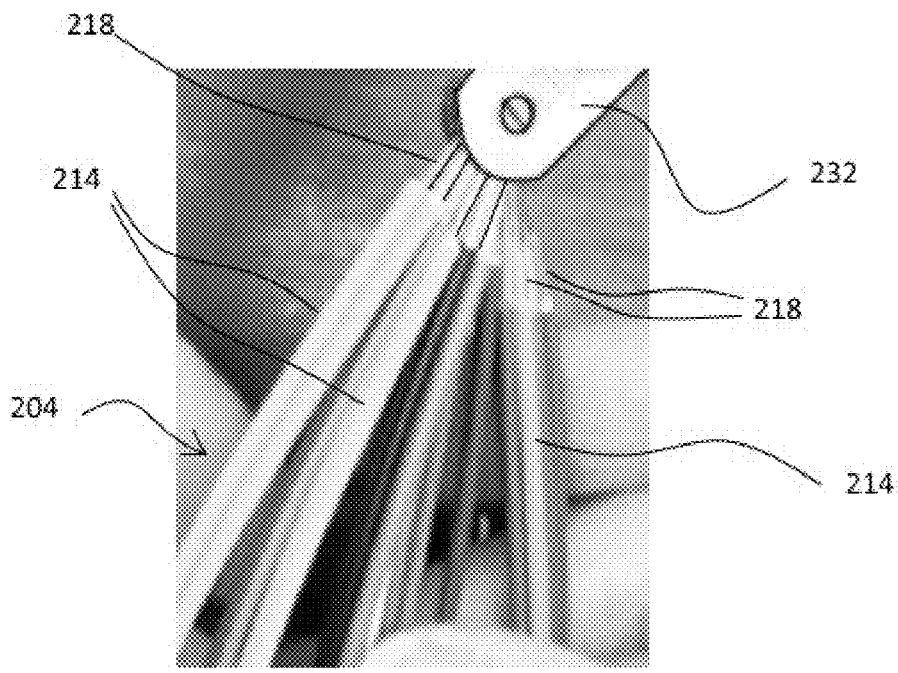
FIG. 10 is a photograph showing a user's hands having threaded pins of the pin assembly of FIG. 9a into the furcation tubes, with the pins retained on the pin retainer, for some embodiments of the preset disclosure.

In some embodiments, when a user slidably inserts free ends of the pins 211 into the furcation tubes 204, the pins 211 remain pivotably connected to the pin retaining member 232 at opposite ends thereof. When a pin 211 is being inserted, other pins can be pivoted away from the pin currently being inserted, to facilitate handling of the current pin without interference from other pins. When all pins 211 have been selectively inserted into furcation tubes 204 (which may comprise the outer jacket 214 and inner tube 218), the pin retaining member is also effectively removably attached to the furcation tubes 204, as shown in FIG. 10. As will be appreciated by those skilled in the art after reviewing this disclosure, in some embodiments, the furcation tubes 204 (e.g., outer jacket 214) may be marked, such as by being color coded for example, and a user may selectively arrange the furcation tubes relative to the pin assembly 230 when attaching the pins 211 thereto. In this manner, the furcation tubes 204 can be stacked such that a later molded array will have the desired arrangement. See, e.g., FIGS. 11a and 11b.

Figure 11A:
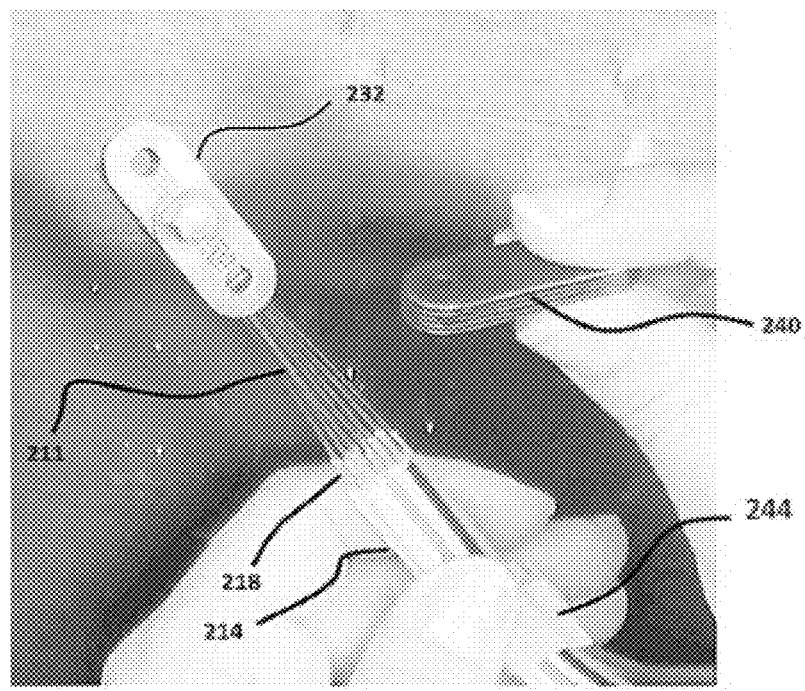
FIGS. 11a-11c are photographs showing a stacking separator of the present disclosure used to assist in retaining a stacking arrangement of the pins, to influence a configuration of the molded array during molding, for some embodiments of the present disclosure.
Figure 11B:
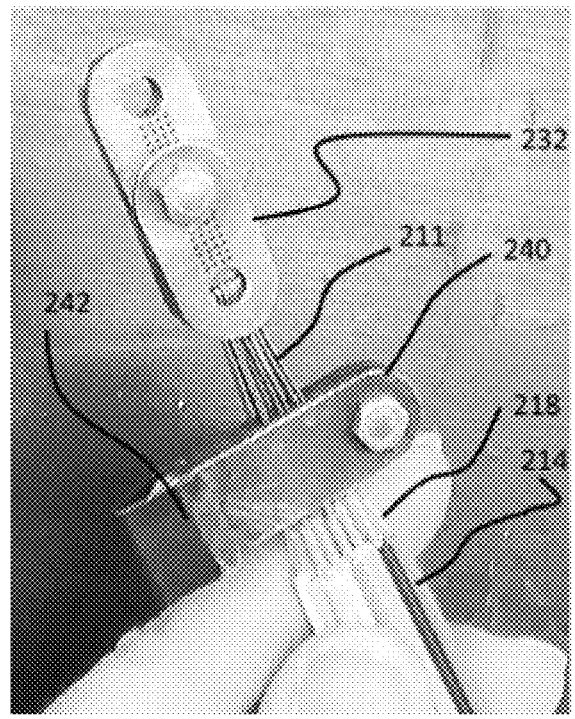
Figure 11C:
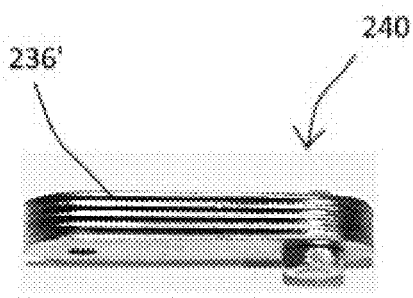

Referring to FIGS. 11a-11c, in some embodiments, after the pins 211 are inserted into the furcation tubes, a stacking separator 240 or spacer, having similar configuration to the pin retainer 232, with horizontally extending slots, corresponding to the number of slots on the pin retainer 232, may be provided. The stacking separator 240 can help retain the stacked tubing configuration as may be selected by a user, so that the heated molded array will have a sufficient shape to later to be connected to the housing 207 and also so that a user can selectively insert fibers if necessary, into designated furcation tubes 204 via the molded array openings if the molded array is formed with sufficient structure to maintain the arrangement selected by a user during stacking of the tubes before heating, as will be appreciated by those skilled in the art after reviewing this disclosure. In particular, the stacking separator 240 can be removably attached to the pins 211, with a set of pins 211' slidably inserted laterally into each slot 236' in the separator 240, as best seen in FIGS. 11b and 11c. It is noted that in some embodiments, tape 244 is also used during the stacking to assist a user in arranging the furcation tubes in a selected stacked arrangement. In other embodiments, one or more mechanical clips may be used to in conjunction with tape, or in lieu of tape, to assist in such stacking arrangement, as will be appreciated by those skilled in the art after reviewing this disclosure.

Figure 12:
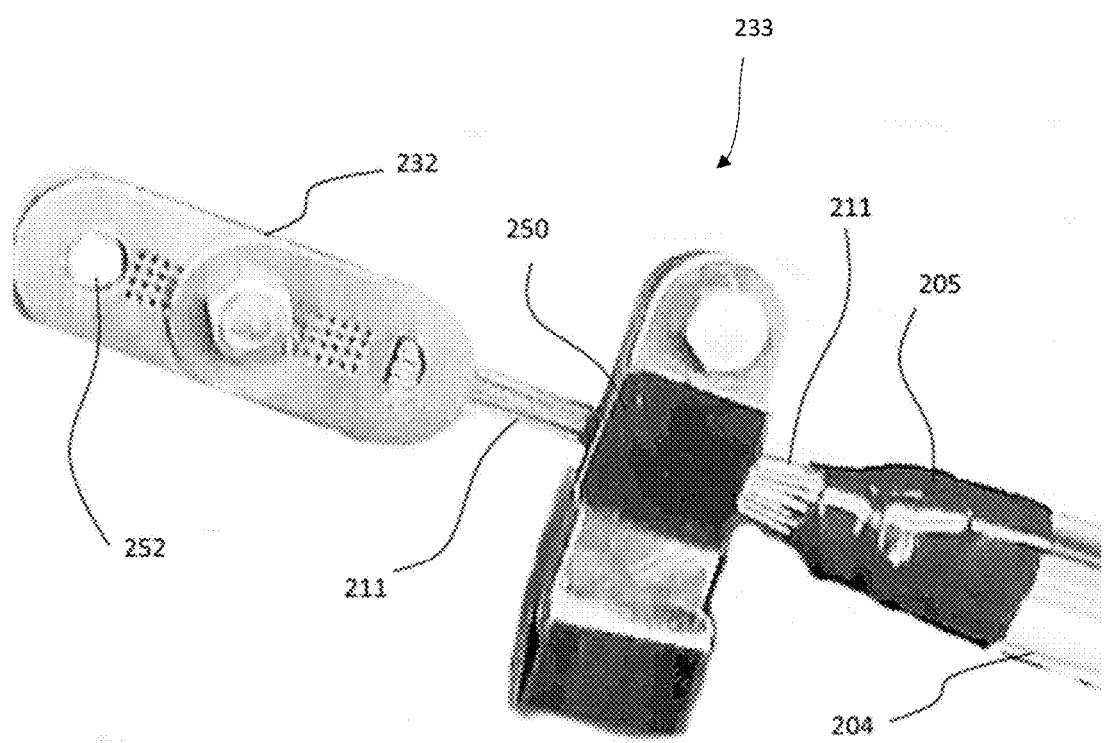
FIG. 12 is a photograph of a molding assembly as described for some embodiments of the present disclosure.

Referring now to FIG. 12, an assembly prepared for molding, or molding assembly 233, is shown, comprising the pin assembly 230 with pins 211 slidably inserted in furcation tubes 204, with a further stacking separator retaining clip 250, namely, a mechanical clip attached to the stacking separator 240 and pins 211 to secure them together, and with tape 205 wrapped about the rearward portion of the array to be molded (similar or identical to the structure and method described above).

Figure 13A:
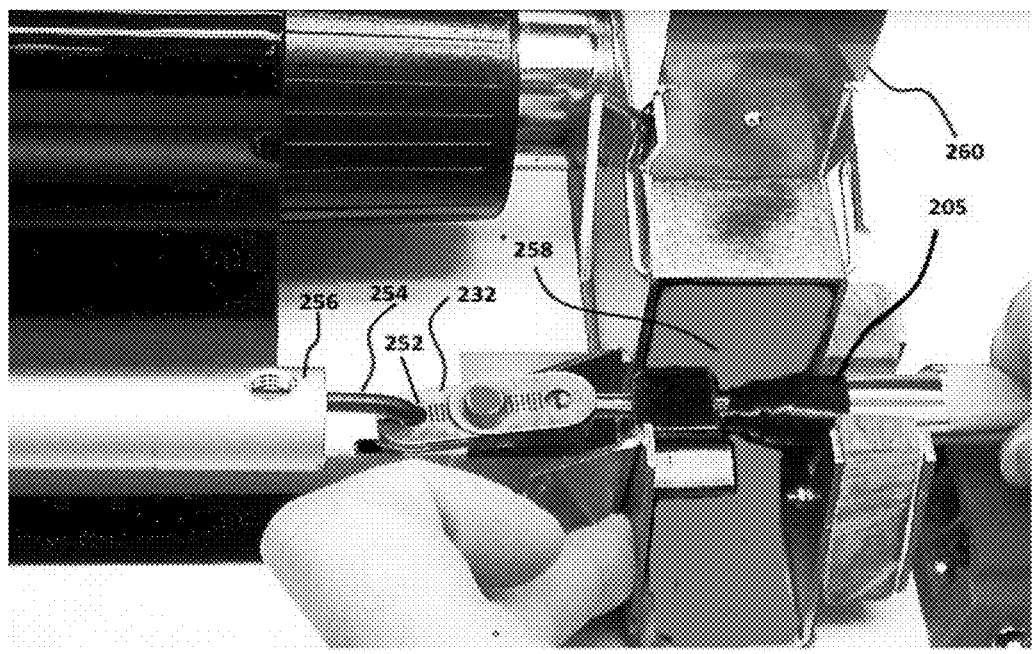
FIGS. 13a & 13b are photographs showing a molding machine having a pull arm, pull hook and heating compartment for use in heating the bundled array for generating the molded array for some embodiments of the present disclosure.
Figure 13B:
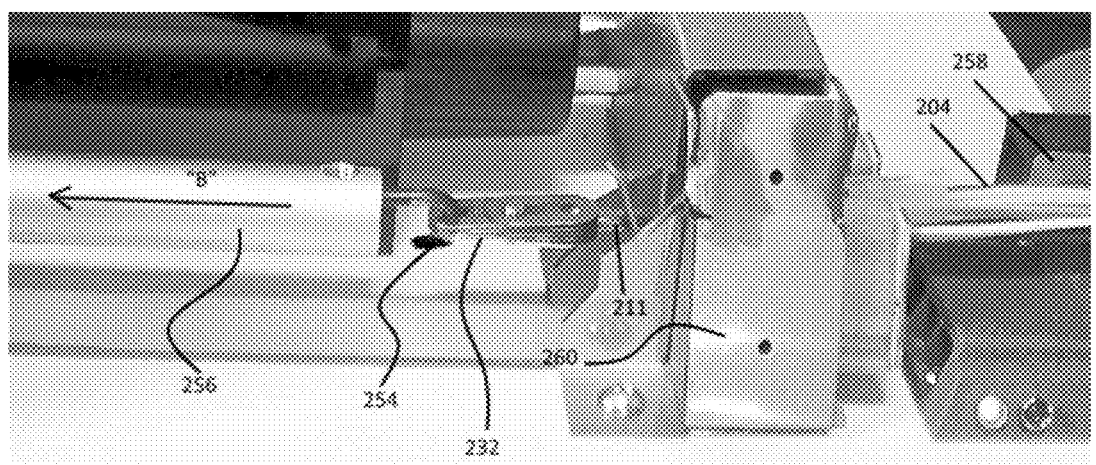

Referring to FIGS. 13a and 13b, in some embodiments, a heat compartment 258 is provided, which is in communication with a heat source, and cooling source. The heat component can receive a section of the molding assembly 233 (See, FIG. 12), including the portion wrapped in adhesive tape 205 for molding that portion into the molded portion 209. In some embodiments, the pin retainer 232 includes an aperture or bore 252, which can receive a pull hook 254. The pull hook is, in turn, fixedly connected to a pull arm 256 or piston member, which is mechanized as described further below. Also, a clamp 258 is provided adjacent the heat compartment 258, on an opposite side therefrom from the pull hook 252, for use in retaining a forward portion of the furcation tube 204 array.

As such, a user can attach the pin retainer 232 to the pull hook 254, then secure the taped portion (to be formed into the molded portion 209) of the molding assembly 233 within the heat compartment 258, and secure the forward portion of the furcation tube array by the clamp 258. Thereafter, the user can shut a heat compartment door 260, and initiate a heating cycle to heat mold the furcation tubes 204 in the heat compartment. The heating cycle can include a cooling period, which can be automatically controlled by a molding machine (not fully illustrated). Thereafter, the molded portion 209 can be formed and be solidified sufficiently for use. In some embodiments, once the heating cycle is complete, the pull arm 256 can be automatically activated by a control center to retract in the direction indicated by arrow "B" in FIG. 13b, to pull the pull hook 254, causing the pins 211 to be slidably removed from the molded portion 209 within the heating compartment covered by door 260. Thereafter, in some embodiments, the pin retainer 232 will drop from the hook and may fall into a receptacle. As will be appreciated by those skilled in the art after reviewing this disclosure, the mechanized movement of the pull arm along an axis thereof, can remove the pins 211 in uniform fashion and help prevent damage to the molded portion 209. Also, the pull arm can be controlled to automatically return to position for a next heating cycle to treat a next molding assembly 233.

In some embodiments, after the molding portion 209 is removed from the heating compartment 258, the tape 205 can be removed and the molded portion 209 can be trimmed for use, such as described supra.

Referring to FIGS. 10, 11a, 11b, and 12, it is noted that in some embodiments, during preparation of the molding assembly 233, a user can strip outer tube jackets 214, from rearward end portion of the furcation tubes to expose inner tubes 218 to form a section to be formed in the molded portion 209 (or to be formed as part of the molded portion). In some embodiments, when such portion is taped with tape 205 in preparing the molding assembly 233, it can include only the inner tubes 218, or the inner tubes 218 and part of the rearward end portions of the outer tube jackets 214.

Also, it is noted that in some embodiments, the pins, pin retainer, spacers and other components, can be made of heat conductive materials where suitable that will not deform at the molding temperatures (e.g., metal and/or steel), to assist in conducting heat to the furcation tubes during molding, as will be appreciated by those skilled in the art after reviewing this disclosure.

The various embodiments described herein, are presented as non-limiting example embodiments, unless otherwise expressly indicated. After reviewing the present disclosure, an individual of ordinary skill in the art will immediately appreciate that some details and features can be added, removed and/or changed without deviating from the spirit of the disclosure. Reference throughout this specification to "various embodiments," or "some embodiments," means that a particular feature, structure or characteristic described in connection with the embodiment(s) is included in at least one or some embodiment(s), but not necessarily all embodiments, such that the references do not necessarily refer to the same embodiment(s). The particular features may be combined in any suitable manner in one or more embodiments. These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

What is claimed is:

1. A molding system for use in molding a furcation tube bundle to generate a molded array, the molding systems comprising:
   an automated pull arm having an attachment member affixed thereto for use in attaching the pull arm to a pin retaining member;
   a plurality of pins attached to the pin retainer member;
   a heating compartment disposed adjacent the pull arm; and
   a clamp member for use in retaining the furcation tube bundle when the automated pull arm is activated to pull the plurality of pins from a molded portion of the furcation tube bundle.

2. The system of claim 1 wherein the pin retainer member comprises a plurality of slots from which the plurality of pins extend.

3. The system of claim 2 wherein the plurality of slots are defined by vertically stacked separating strips.

4. The system of claim 1 further comprising a stacking separator member, the stacking separator member having a plurality of horizontal slots defined by vertically stacked wall members.

* * * * *